United States Patent
Butt et al.

(10) Patent No.: US 10,470,215 B2
(45) Date of Patent: Nov. 5, 2019

(54) COEXISTENCE OF USERS WITH DIFFERENT LATENCY REQUIREMENTS

(71) Applicant: Telefonaktiebolaget LM Ericsson (publ), Stockholm (SE)

(72) Inventors: Naveed Butt, Lund (SE); Rocco Di Taranto, Lund (SE); Dzevdan Kapetanovic, Lund (SE); Thomas Nilsson, Malmo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 44 days.

(21) Appl. No.: 15/761,807

(22) PCT Filed: Sep. 23, 2015

(86) PCT No.: PCT/EP2015/071857
§ 371 (c)(1),
(2) Date: Mar. 20, 2018

(87) PCT Pub. No.: WO2017/050364
PCT Pub. Date: Mar. 30, 2017

(65) Prior Publication Data
US 2018/0279368 A1    Sep. 27, 2018

(51) Int. Cl.
*H04W 74/08* (2009.01)
*H04W 72/04* (2009.01)
*H04W 72/08* (2009.01)

(52) U.S. Cl.
CPC ... *H04W 74/0816* (2013.01); *H04W 72/0453* (2013.01); *H04W 72/08* (2013.01); *H04W 74/0875* (2013.01)

(58) Field of Classification Search
CPC ......... H04W 74/0816; H04W 72/0453; H04W 72/08; H04W 74/0875
See application file for complete search history.

(56) References Cited

U.S. PATENT DOCUMENTS 9,681,422 B2 * 6/2017 Nakahara ............. H04W 72/02
2002/0163933 A1   11/2002 Benveniste
(Continued)

FOREIGN PATENT DOCUMENTS

WO   2015017463 A2   2/2015

OTHER PUBLICATIONS

PCT International Search Report, dated Jun. 20, 2016, in connection with International Application No. PCT/EP2015/071857, all pages.
(Continued)

*Primary Examiner* — Melvin C Marcelo
(74) *Attorney, Agent, or Firm* — Leffler Intellectual Property Law, PLLC

(57) ABSTRACT

A method of an access point is disclosed. The access point is adapted to communicate (using a frequency bandwidth comprising one or more sub-bands) with wireless communication devices associated with the access point. Each of the wireless communication devices is adapted to operate under at least one of first and second latency requirements, wherein the first latency requirement is lower than the second latency requirement. Each of the wireless communication devices is also adapted to use a listen-before-talk approach (e.g. carrier sense multiple access with collision avoidance—CSMA/CA) to access a sub-band for transmission. The method comprises (for each of the sub-bands) allowing at most one wireless communication device operating under the first latency requirement to attempt accessing the sub-band and (for each sub-band where a wireless communication device operating under the first latency requirement is allowed to attempt accessing the sub-band) allowing also one or more wireless communication device operating under the second latency requirement to attempt accessing the sub-band. The method also comprises enforcing a maximum duration of time for each transmission of a (Continued)

wireless communication device operating under the second latency requirement using a sub-band where a wireless communication device operating under the first latency requirement is allowed to attempt accessing the sub-band, wherein the maximum duration of time is based on the first latency requirement. Corresponding method for a wireless communication device, arrangements, access point, wireless communication device and computer program products are also disclosed.

36 Claims, 3 Drawing Sheets

(56) References Cited

U.S. PATENT DOCUMENTS

| | | |
|---|---|---|
| 2009/0103488 A1 | 4/2009 | Zhu et al. |
| 2010/0142465 A1 | 6/2010 | Medepalli et al. |
| 2013/0010769 A1 | 1/2013 | Kang et al. |
| 2013/0016735 A1 | 1/2013 | De Campos Cartolomeu et al. |
| 2013/0100945 A1 | 4/2013 | Moorti et al. |
| 2014/0254518 A1* | 9/2014 | Wentink ............ H04W 74/0816 370/329 |
| 2014/0254552 A1 | 9/2014 | Hayes et al. |
| 2014/0307653 A1 | 10/2014 | Liu et al. |
| 2014/0328313 A1 | 11/2014 | Merlin et al. |
| 2015/0103767 A1 | 4/2015 | Kim et al. |

OTHER PUBLICATIONS

PCT Written Opinion, dated Jun. 20, 2016, in connection with International Application No. PCT/EP2015/071857, all pages.

\* cited by examiner

COEXISTENCE OF USERS WITH DIFFERENT LATENCY REQUIREMENTS

TECHNICAL FIELD

The present invention relates generally to the field of listen-before-talk (LBT, e.g. CSMA/CA— carrier sense multiple access with collision avoidance) systems. More particularly, it relates to an approach for LBT systems to accommodate users with different latency requirements.

BACKGROUND

Carrier sense multiple access with collision avoidance (CSMA/CA) is a multiple access technique used, for example, in the WLAN (wireless local area network) standard IEEE 802.11ac.

According to the principles of CSMA/CA, a device that has anything to transmit must first sense the communication channel and determine it to be free during at least a sensing period before initiating transmission. If the device determines the communication channel to be busy, it continues the sensing process until the communication channel is free during at least the sensing period. Typically, the device may apply a back-off period (see below) before continuing the sensing process when it determines the communication channel to be busy. Once a device gets hold of the communication channel, it may perform its transmission (e.g. transmit data as OFDM symbols).

If two (or more) devices happen to initiate transmission at the same time (both having determined the communication channel to be free during their respective sensing periods as explained above) a collision occurs. When a probable collision is detected (typically by detecting a packet loss), each device involved in the collision defers its transmission associated activity during a back-off period. When the back-off period has elapsed the device iterates the procedure, starting with the sensing of the communication channel, until the transmission is complete.

To reduce the probability of a second collision, the back-off period of a device is a randomly chosen time period whose length is chosen according to a distribution within a certain range, called the contention window (CW).

Different users (e.g. different devices and/or different services used by a device) may have different latency requirements. The latency requirements may typically relate to the maximum acceptable time from a need to transmit until a successful transmission is accomplished. Such a maximum acceptable time will, inherently include a time for accessing the communication channel.

To exemplify how different latency requirements may be handled, the various types of access categories (AC) introduced in WLAN standards may be considered. These include high priority services, such as voice (AC_VO), using a shorter contention window (i.e. a shorter back-off period on the average) and a shorter sensing period (defined by the arbitration inter frame space (AIFS)) than low-priority services. This enables that the high priority services, when they contend with low-priority services for the communication channel, have a higher probability of getting hold of the communication channel than low-priority services and that they, consequently, experience shorter delays.

Even so, the experienced delay from the time when a need for transmission arises to the time of accomplished transmission may not be acceptably short for some applications. For example, other time-critical applications are emerging that would require even shorter delays than the current high priority services such as voice.

Therefore, there is a need for alternative approaches for CSMA/CA systems to accommodate users with different latency requirements.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should be noted that WLAN (IEEE 802.11) standard terminology and CSMA/CA may be used herein to exemplify various embodiments. However, this is not meant as limiting the scope of the invention. Contrarily, various embodiments may be equally applicable to any system employing a listen-before-talk approach and adapted to accommodate users with different latency requirements.

It is an object of some embodiments to solve or mitigate at least some of the above or other disadvantages.

According to a first aspect, this is achieved by a method of an access point adapted to communicate, using a frequency bandwidth comprising one or more sub-bands, with wireless communication devices associated with the access point.

Each of the wireless communication devices is adapted to operate under at least one of first and second latency requirements, the first latency requirement being lower than the second latency requirement, and each of the wireless communication devices is adapted to use a listen-before-talk approach to access a sub-band for transmission.

The method comprises (for each of the sub-bands) allowing at most one wireless communication device operating under the first latency requirement to attempt accessing the sub-band and (for each sub-band where a wireless communication device operating under the first latency requirement is allowed to attempt accessing the sub-band) allowing also one or more wireless communication device operating under the second latency requirement to attempt accessing the sub-band.

The method also comprises enforcing a maximum duration of time for each transmission of a wireless communication device operating under the second latency requirement using a sub-band where a wireless communication device operating under the first latency requirement is allowed to attempt accessing the sub-band, wherein the maximum duration of time is based on the first latency requirement.

The first latency requirement being lower than the second latency requirement may be defined as a first maximum accepted latency being lower than a second maximum accepted latency, wherein the first maximum accepted latency is associated with the first latency requirement and the second maximum accepted latency is associated with the second latency requirement.

In some embodiments, the second latency requirement may be defined as any latency being acceptable. Using the definition above, this translates to the second maximum accepted latency having an infinitely high value.

The one or more sub-bands may be two or more sub-bands in some embodiments.

A wireless communication device operating under the first latency requirement may be termed a high priority user according to some embodiments. When there is more than one high priority users associated with the access point, their respective first latency requirements may relate to the same, similar or different maximum acceptable latencies; all falling under the first latency requirement.

Using a listen-before-talk approach to access a sub-band for transmission may comprise sensing the sub-band during a sensing period, initiating transmission if the sub-band was not used during the sensing period and, if the transmission collides with a transmission of another wireless communication device, waiting during a back-off period before repeating the sensing of the sub-band.

In some embodiments, the maximum duration of time is shorter or equal to the first maximum accepted latency associated with the first latency requirement minus the sensing period of a wireless communication device operating under the first latency requirement.

According to some embodiments, at least one of the sensing period and the back-off period of a wireless communication device operating under the first latency requirement may be shorter than a corresponding period of a wireless communication device operating under the second latency requirement. For example, the back-off period may be set to zero.

Enforcing the maximum duration of time may, in some embodiments, comprise instructing the wireless communication device operating under the second latency requirement to fragment data to be transmitted into packet parts (wherein each packet part is transmittable during the maximum duration using the sub-band) and transmit the packet parts with a transmission gap after each of the packet parts, wherein the transmission gap has a duration which is at least as long as the sensing period of a wireless communication device operating under the first latency requirement.

The duration of the transmission gap may, according to some embodiments, be shorter than the sensing period of a wireless communication device operating under the second latency requirement.

Enforcing the maximum duration of time may, in some embodiments, comprise determining an amount of sub-bands (wherein a packet of data to be transmitted is transmittable during the maximum duration of time using the amount of sub-bands) and instructing the wireless communication device operating under the second latency requirement to simultaneously sense multiple sub-bands (wherein the multiple is not less than the amount) and transmit the packet using the amount of sub-bands and only if at least the amount of sub-bands were not used during the sensing period.

In some embodiments, the method may further comprise transmitting an indication of the amount to the wireless communication device operating under the second latency requirement.

According to some embodiments, the method may further comprise limiting a number of wireless communication devices associated with the access point and operating under the first latency requirement to a value, wherein the value is less than or equal to the one or more sub-bands comprised in the frequency bandwidth. The value may, for example, be dependent on the first latency requirement (e.g. a first maximum accepted latency associated with the first latency requirement) of the wireless communication devices associated with the access point and operating under the first latency requirement. Alternatively or additionally, the value may be dependent on throughput requirements of the wireless communication devices associated with the access point and operating under the first latency requirement.

In some embodiments, the method may further comprise (for each sub-band where no wireless communication device operating under the first latency requirement is allowed to attempt accessing the sub-band) allowing wireless communication devices operating under the second latency requirement to attempt accessing the sub-band.

A second aspect is a method of a wireless communication device adapted to operate under a second latency requirement and associated with an access point, wherein the access point is adapted to communicate (using a frequency bandwidth comprising one or more sub-bands) with wireless communication devices associated with the access point. Each of the wireless communication devices is adapted to operate under at least one of a first and the second latency requirements, the first latency requirement being lower than the second latency requirement, and each of the wireless communication devices is adapted to use a listen-before-talk approach to access a sub-band for transmission.

The method comprises employing a maximum duration of time for each transmission using a sub-band where a wireless communication device operating under the first latency requirement is allowed to attempt accessing the sub-band, wherein the maximum duration of time is based on the first latency requirement.

Employing the maximum duration of time may, according to some embodiments, comprise fragmenting data to be transmitted into packet parts (wherein each packet part is transmittable during the maximum duration using the sub-band) and transmitting the packet parts with a transmission gap after each of the packet parts (wherein the transmission gap has a duration which is at least as long as the sensing period of a wireless communication device operating under the first latency requirement).

Employing the maximum duration of time may, according to some embodiments, comprise simultaneously sensing multiple sub-bands (wherein the multiple is not less than an amount, and wherein a packet of data to be transmitted is transmittable during the maximum duration of time using the amount of sub-bands) and transmitting the packet using the amount of sub-bands and only if at least the amount of sub-bands were not used during the sensing period.

In some embodiments, the method may further comprise receiving an indication of the amount from the access point.

In some embodiments, the second aspect may additionally have features identical with or corresponding to any of the various features as explained above for the first aspect, and vice versa.

A third aspect is a computer program product comprising a computer readable medium, having thereon a computer program comprising program instructions. The computer program is loadable into a data-processing unit and adapted to cause execution of the method according to any of the first and/or second aspect when the computer program is run by the data-processing unit.

According to a fourth aspect, an arrangement is provided for an access point adapted to communicate (using a frequency bandwidth comprising one or more sub-bands) with wireless communication devices associated with the access point.

Each of the wireless communication devices is adapted to operate under at least one of first and second latency requirements, the first latency requirement being lower than the second latency requirement, and each of the wireless communication devices is adapted to use a listen-before-talk approach to access a sub-band for transmission.

The arrangement comprises a controller adapted to cause (for each of the sub-bands) allowance of at most one wireless communication device operating under the first latency requirement to attempt accessing the sub-band and (for each sub-band where a wireless communication device operating under the first latency requirement is allowed to attempt accessing the sub-band) allowance of also one or more wireless communication device operating under the second latency requirement to attempt accessing the sub-band.

The controller is also adapted to cause enforcement of a maximum duration of time for each transmission of a wireless communication device operating under the second latency requirement using a sub-band where a wireless communication device operating under the first latency requirement is allowed to attempt accessing the sub-band, wherein the maximum duration of time is based on the first latency requirement.

In some embodiments, the controller may be adapted to cause enforcement of the maximum duration of time by instructing the wireless communication device operating under the second latency requirement to fragment data to be transmitted into packet parts (wherein each packet part is transmittable during the maximum duration using the sub-band) and transmit the packet parts with a transmission gap after each of the packet parts (wherein the transmission gap has a duration which is at least as long as the sensing period of a wireless communication device operating under the first latency requirement).

In some embodiments, the controller may be adapted to cause enforcement of the maximum duration of time by determining an amount of sub-bands (wherein a packet of data to be transmitted is transmittable during the maximum duration of time using the amount of sub-bands) and instructing the wireless communication device operating under the second latency requirement to simultaneously sense multiple sub-bands, wherein the multiple is not less than the amount, and transmit the packet using the amount of sub-bands and only if at least the amount of sub-bands were not used during the sensing period.

The controller may, according to some embodiments, be further adapted to cause limitation of a number of wireless communication devices associated with the access point and operating under the first latency requirement to a value, wherein the value is less than or equal to the one or more sub-bands comprised in the frequency bandwidth.

The controller may, according to some embodiments, be further adapted to cause (for each sub-band where no wireless communication device operating under the first latency requirement is allowed to attempt accessing the sub-band) allowance of wireless communication devices operating under the second latency requirement to attempt accessing the sub-band.

In some embodiments, the fourth aspect may additionally have features identical with or corresponding to any of the various features as explained above for the first aspect.

A fifth aspect is an access point comprising the arrangement of the fourth aspect.

A sixth aspect is an arrangement for a wireless communication device adapted to operate under a second latency requirement and associated with an access point, wherein the access point is adapted to communicate (using a frequency bandwidth comprising one or more sub-bands) with wireless communication devices associated with the access point.

Each of the wireless communication devices is adapted to operate under at least one of a first and the second latency requirements, the first latency requirement being lower than the second latency requirement, and each of the wireless communication devices is adapted to use a listen-before-talk approach to access a sub-band for transmission.

The arrangement comprises a controller adapted to cause employment of a maximum duration of time for each transmission using a sub-band where a wireless communication device operating under the first latency requirement is allowed to attempt accessing the sub-band, wherein the maximum duration of time is based on the first latency requirement.

In some embodiments, the controller may be adapted to cause employment of the maximum duration of time by causing fragmentation of data to be transmitted into packet parts (wherein each packet part is transmittable during the maximum duration using the sub-band) and transmission of the packet parts with a transmission gap after each of the packet parts (wherein the transmission gap has a duration which is at least as long as the sensing period of a wireless communication device operating under the first latency requirement).

In some embodiments, the controller may be adapted to cause employment of the maximum duration of time by causing simultaneous sensing of multiple sub-bands, wherein the multiple is not less than an amount, wherein a packet of data to be transmitted is transmittable during the maximum duration of time using the amount of sub-bands, and transmission of the packet using the amount of sub-bands and only if at least the amount of sub-bands were not used during the sensing period.

In some embodiments, the sixth aspect may additionally have features identical with or corresponding to any of the various features as explained above for the first, second or fourth aspects.

A seventh aspect is a wireless communication device comprising the arrangement of the sixth aspect.

In any of the aspects, the access point and the wireless communication devices may, according to some embodiments, be compliant with any applicable version of the IEEE standard 802.11 (e.g. 802.11a, 802.11b, 802.11g, 802.11n, 802.11 ax, or a future version of 802.11).

Generally, a feature explained herein in relation to one aspect or embodiment may, alternatively or additionally, be comprised another aspect or embodiment as applicable.

An advantage of some embodiments is that a (very) low latency requirement (the first latency requirement) of some users in a system may be met.

Typically, a low latency requirement user—once associated with an access point—will experience a reduced worst-case delay in getting hold of the communication channel whenever it needs to transmit anything compared to the worst-case delay of prior art systems.

Another advantage of some embodiments is that users with a more relaxed latency requirement (the second latency requirement) still receive appropriate access to the communication channel.

BRIEF DESCRIPTION OF THE DRAWINGS

Further objects, features and advantages will appear from the following detailed description of embodiments, with reference being made to the accompanying drawings, in which.

DETAILED DESCRIPTION

The notations wireless communication device, device and user will be used interchangeably herein. Furthermore, CSMA/CA will be used as an example of a listen-before-talk approach. The first and second latency requirements may be referred to, respectively, as low and high (or higher than the low) latency requirements in the following.

In the following, embodiments will be described for CSMA/CA systems, where users (wireless communication devices) having a low latency requirement may be appropriately served by an access point while the access point can still appropriately serve other users. Generally this is achieved by allowing at most one user having a low latency requirement to attempt accessing each sub-band used by the CSMA/CA system and by enforcing (for each such sub-band) a maximum duration of time for each transmission of a user having a higher latency requirement than the low latency requirement when such a user uses the sub-band. The maximum duration of time is based on the low latency requirement.

Figure 1:
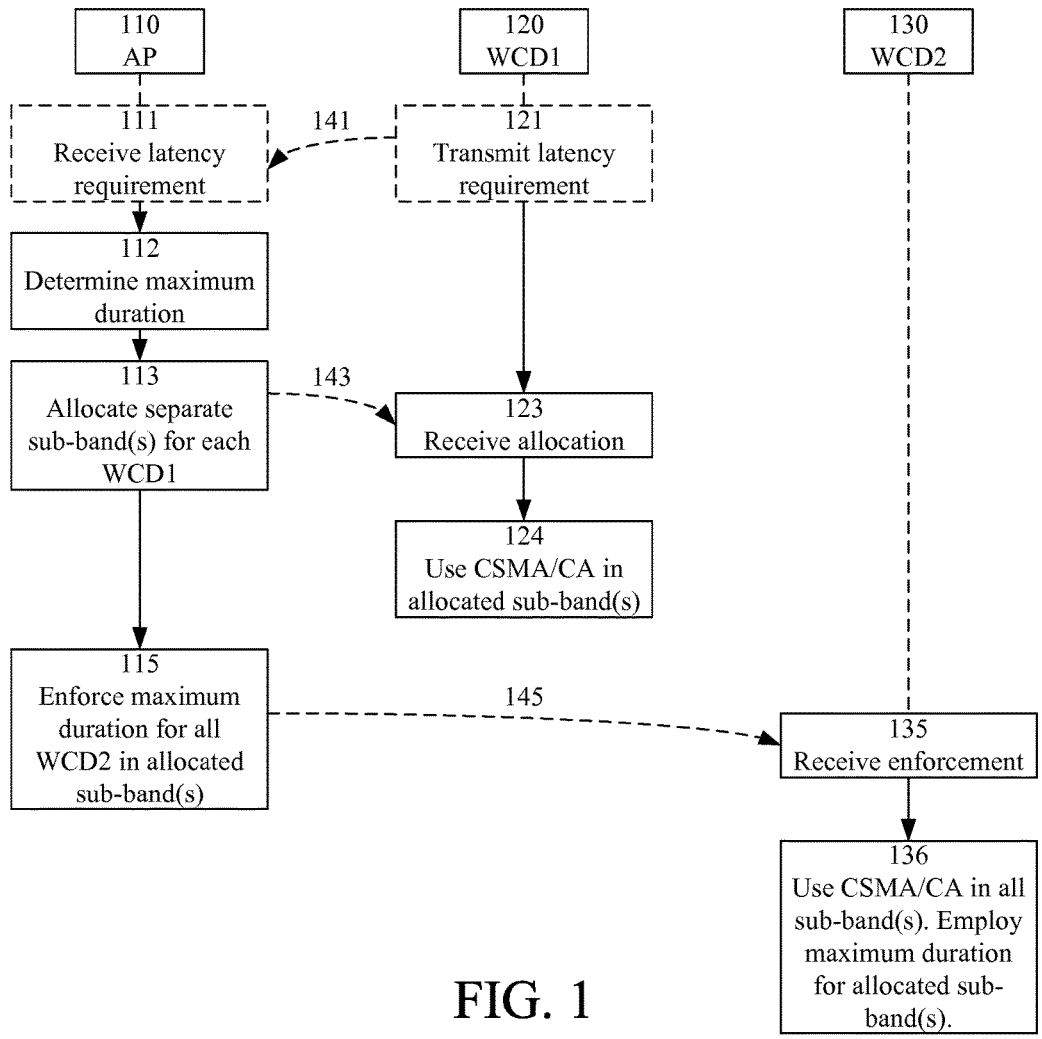
FIG. 1 is a flowchart illustrating example method steps according to some embodiments.

FIG. 1 illustrates example method steps performed, respectively, by an access point (AP) 110, a first wireless communication device (WCD1) 120 and a second wireless communication device (WCD2) 130 according to some embodiments.

The access point 110 is adapted to communicate, using a frequency bandwidth comprising one or more sub-bands, with wireless communication devices (e.g. WCD1 and WCD2) associated with the access point. Each of the wireless communication devices is adapted to use carrier sense multiple access with collision avoidance (CSMA/CA) to access a sub-band for transmission.

WCD1 is adapted to operate under a first latency requirement and WCD2 is adapted to operate under a second latency requirement, wherein the first latency requirement is lower than the second latency requirement. Of course, the access point 110 may have one or more other wireless communication devices associated with it, each with a respective latency requirement (which may be a first latency requirement—same, similar or different than that of WCD1—or a second latency requirement).

In some embodiments, the latency requirement of WCD1 is communicated to the access point 110 as illustrated by step 121, where WCD1 transmits its latency requirement 141 or an indication thereof, and step 111, where the access point 110 receives the latency requirement or indication. Alternatively or additionally, the access point may be aware of the latency requirement of WCD1 through some other channel.

In step 112, the access point 110 determines a maximum duration of time based on the latency requirement of WCD1.

In step 113, the access point 110 allocates at least one sub-band for WCD1 and communicates 143 the allocation to WCD1. By the allocation of step 113, each wireless communication device having a low latency requirement is allocated one or more separate sub-bands (i.e. no sub-band is allocated to more than one wireless communication device having a low latency requirement). The sub-band allocation 143 is received by WCD1 in step 123 and in step 124 WCD1 uses CSMA/CA to enable communication in the allocated sub-band(s).

Thus, for each of the sub-bands at most one wireless communication device operating under the first latency requirement is allowed to attempt accessing the sub-band. Even so, for each sub-band where a wireless communication device operating under the first latency requirement (e.g. the sub-band allocated to WCD1 in step 113) is allowed to attempt accessing the sub-band other wireless communication devices having the second latency requirement (e.g. WCD2) are also allowed to attempt accessing the sub-band under certain restrictions.

Such restrictions are illustrated in step 115, where the access point 110 enforces the maximum duration of time for each transmission of WCD2 in the sub-band allocated to WCD1. The enforcement may, for example, comprise sending an enforcement command 145 to WCD2, and WCD2 employs the maximum duration for the allocated sub-bands (step 136) when the enforcement command 145 has been received in step 135.

For sub-bands that have not been allocated to any wireless communication device having the first latency requirement, wireless communication devices operating under the second latency requirement may use the sub-band without employing any maximum duration of time for transmission.

The number of users having the first latency requirement (and/or the number of sub-bands available for specific allocation) may be limited in some embodiments. The limitation may, for example, be based on a trade-off between meeting low latency requirements and overall throughput demands.

Example details of the maximum duration of time and of the enforcement and employment thereof will now be given with reference to FIGS. 2, 3 and 4.

Figure 2:
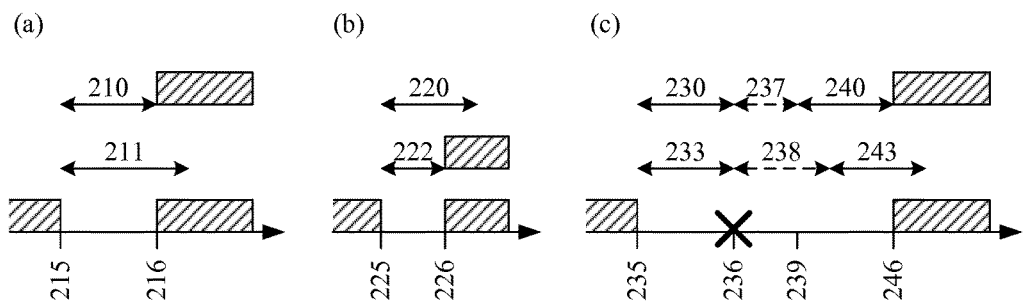
FIG. 2 is a schematic drawing illustrating principles of CSMA/CA.

FIG. 2 schematically illustrates some principles of CSMA/CA via three scenarios (a), (b) and (c). Using CSMA/CA to access a sub-band for transmission typically comprises sensing the sub-band during a sensing period 210, 211, 220, 222, 230, 233 and initiating transmission if the sub-band was not used during the sensing period.

In scenario (a), the sub-band (channel) becomes free at time 215 and two different users sense the channel during their respective sensing period 210, 211. At time 216, the sensing period 210 of the upper user ends and that user starts transmission resulting in that the lower user finds the channel busy during part of its sensing period 211 and will, hence, not transmit anything.

In scenario (b), the sub-band (channel) becomes free at time 225 and two different users sense the channel during their respective sensing period 220, 222. At time 226, the sensing period 222 of the lower user ends and that user starts transmission resulting in that the upper user finds the channel busy during part of its sensing period 220 and will, hence, not transmit anything.

It is clear from scenarios (a) and (b) that the user with shortest sensing period will always win the contention for the channel provided they start their sensing periods at the same time.

In scenario (c), the sub-band (channel) becomes free at time 235 and two different users sense the channel during their respective sensing period 230, 233. At time 236, the sensing periods 230, 233 of both users end at the same time and the users start transmission simultaneously resulting in a collision (illustrated by an x).

In CSMA/CA, a user that detects a collision typically stops its transmission and waits during a back-off period before repeating the sensing of the sub-band. In scenario (c), the upper user has a back-off period 237 that ends at time 239 before the back-off period 238 of the lower user.

When their respective back-off periods have ended, the two different users of scenario (c) sense the channel again during their respective sensing periods 240, 243. At time 246, the sensing period 240 of the upper user ends and that user starts transmission resulting in that the lower user finds the channel busy during part of its sensing period 243 and will, hence, not transmit anything.

It is clear from scenario (c) that the user with shortest back-off period will always win the contention for the channel after a collision provided that their sensing periods have the same length.

The back-off period is typically implemented as having a random duration chosen (e.g. using a uniform probability distribution) within a contention window.

One way to improve the service to a high priority user is to let at least one of the sensing period and the back-off period (or the mean value of the contention window) of a wireless communication device operating under the first latency requirement be shorter than the sensing period and the back-off period (or the mean value of the contention window), respectively, of a wireless communication device operating under the second latency requirement. For example, the back-off period may be forced to zero, or the maximum limit of the contention window of high priority users may be set lower than the minimum limit of the contention window of non-high priority users.

Furthermore, the maximum duration of time may be related to the sensing period and/or the back-off periods of the users. For example, the maximum duration of time enforced on transmissions of a user having the second latency requirement may be set shorter than or equal to the first maximum acceptable latency minus the sensing period of a user having the first latency requirement to enable the first latency requirement to be met.

Figure 3:
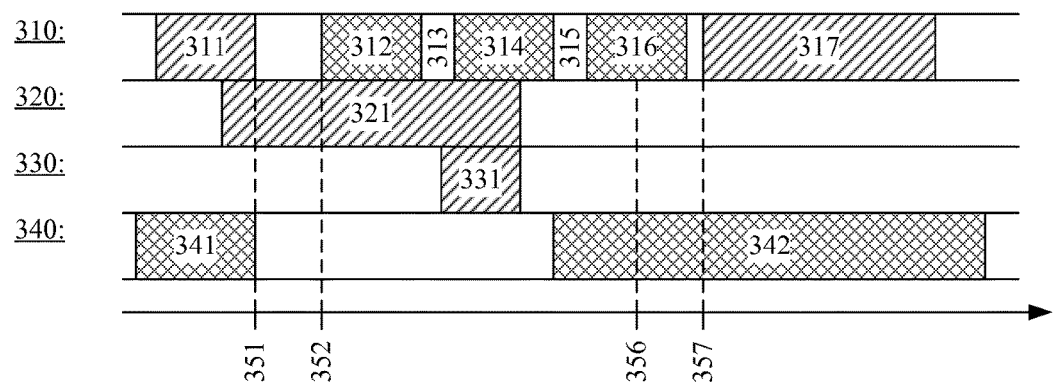
FIG. 3 is a schematic drawing illustrating transmissions in the time-frequency plane according to some embodiments.

FIG. 3 schematically illustrates a scenario of transmissions in the time-frequency plane according to some embodiments. Time is illustrated in the x-axis and the frequency bandwidth is divided into four sub-bands 310, 320, 330, 340. Transmissions of users having low (first) latency requirements are illustrated by striped boxes and transmissions of users having higher than low (second) latency requirements are illustrated by checkered boxes.

In the scenario of FIG. 3, sub-bands 310, 320 and 330 are allocated to respective high priority users, whose transmissions are illustrated at 311, 317, 321 and 331. Sub-band 340 is not allocated to a high priority user and may be used for transmission by other (non-high priority) users without maximum time duration enforcement as illustrated at 341 and 342.

The other (non-high priority) users may also use the sub-bands 310, 320 and 330 allocated to high priority users, but only under the maximum time duration enforcement. FIG. 3 illustrates, in sub-band 310, an example way to implement the maximum time duration enforcement.

At time 351, a transmission 311 by the high priority user of sub-band 310 ends. If a non-high priority user has data to transmit, it may use sub-band 310 after having sensed the sub-band and determined that the sub-band is not used during its sensing period. This determination is made at time 352 in the example of FIG. 3 and the non-priority user starts its transmission.

In this example, the enforcement of the maximum duration of time for transmission is implemented by fragmenting the data to be transmitted into packet parts 312, 314, 316, wherein each packet part is transmittable during the maximum duration of time, and transmitting the packet parts 312, 314, 316 with a transmission gap 313, 315 after each of the packet parts.

If the transmission gap has a duration which is at least as long as the sensing period of the high priority user of the sub-band 310, that user is provided with the opportunity to win the channel (sub-band) in each transmission gap.

Furthermore, if the duration of the transmission gap is shorter than the sensing period of a non-high priority user, such users are prevented from the opportunity to win the channel (sub-band) in a transmission gap and the on-going fragmented transmission can continue if the high priority user does not need the channel.

In the scenario of FIG. 3, the high priority user of sub-band 310 has data to transmit at time 356, and the fragmented transmission 312, 314, 316 is interrupted at the next available transmission gap, where the high priority user starts its transmission 317 after its sensing period has elapsed at time 357 during the transmission gap.

Figure 4:
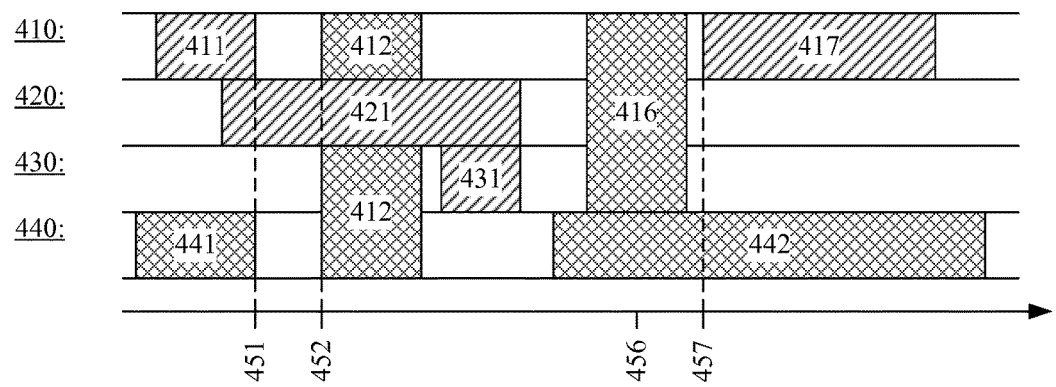
FIG. 4 is a schematic drawing illustrating transmissions in the time-frequency plane according to some embodiments.

FIG. 4 schematically illustrates a scenario of transmissions in the time-frequency plane according to some embodiments. Time is illustrated in the x-axis and the frequency bandwidth is divided into four sub-bands 410, 420, 430, 440. Transmissions of users having low (first) latency requirements are illustrated by striped boxes and transmissions of users having higher than low (second) latency requirements are illustrated by checkered boxes.

In the scenario of FIG. 4, sub-bands 410, 420 and 430 are allocated to respective high priority users, whose transmissions are illustrated at 411, 417, 421 and 431. Sub-band 440 is not allocated to a high priority user and may be used for transmission by other (non-high priority) users without maximum time duration enforcement as illustrated at 441 and 442.

The other (non-high priority) users may also use the sub-bands 410, 420 and 430 allocated to high priority users, but only under the maximum time duration enforcement. FIG. 4 illustrates an example way to implement the maximum time duration enforcement.

At time 451, the transmissions 411 and 441 (by the high priority user of sub-band 410 and a non-high priority user, respectively) end. If a non-high priority user has data to transmit, it may use any sub-band after having sensed the sub-band and determined that the sub-band is not used during its sensing period. This determination can, for example, be made for sub-bands 410, 430 and 440 at time 452 in the example of FIG. 4 (while sub-band 420 is busy).

In this example, the enforcement of the maximum duration of time for transmission is implemented by transmitting a packet over as many sub-bands needed to ensure that the packet can be transmitted during the maximum duration of time. Thus, the non-high priority user that has data to transmit typically senses all sub-bands simultaneously and as soon as enough sub-bands are determined not used during a sensing period, the non-priority user starts its transmission. This is exemplified in FIG. 4 by transmission 412 using sub-bands 410, 430 and 440 and transmission 416 using sub-bands 410, 420 and 430.

In the scenario of FIG. 4, the high priority user of sub-band 410 has data to transmit at time 456, and can start its transmission 417 after its sensing period has elapsed at time 457 after transmission 416 has ended.

Figure 5:
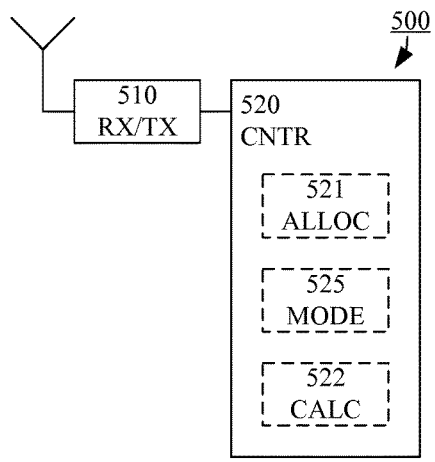
FIG. 5 is a block diagram illustrating an example arrangement according to some embodiments.
Figure 6:
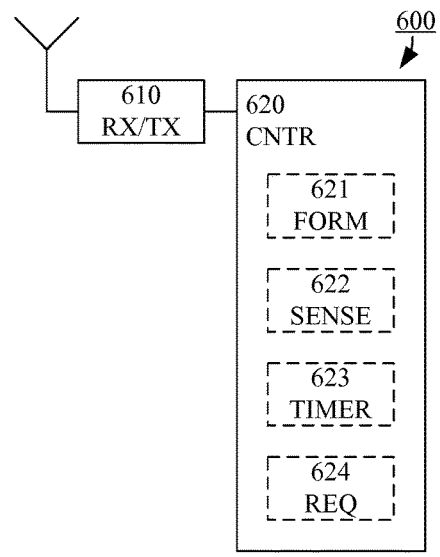
FIG. 6 is a block diagram illustrating an example arrangement according to some embodiments.

FIGS. 5 and 6 schematically illustrate example arrangements 500, 600 for a network node and a wireless communication device, respectively. Generally, each of the arrangements comprises a transceiver (RX/TX) 510, 610 and a controller (CNTR) 520, 620.

The controller 520 may be adapted to cause execution of method steps of the access point 110 described in connection to FIG. 1. The controller 620 may be adapted to cause execution of method steps of the WCD2 130 (and possibly also of the WCD1 120) described in connection to FIG. 1. Details of the examples explained above in connection to FIGS. 1 through 4 are applicable also to the arrangements 500 and 600 and will not be repeated.

The controller 520 of the arrangement 500 may comprise one or more of an allocator (ALLOC) 521, a mode enforcer (MODE) 525, and a calculator (CALC) 522. The calculator may be adapted to determine the maximum duration of time (compare with step 112 of FIG. 1), the allocator may be adapted to allocate sub-bands to high priority users (compare with step 113 of FIG. 1) and the mode enforcer may be adapted to set the non-high priority users in a mode where the maximum duration of time is enforced for transmissions by the user (compare with step 115 of FIG. 1). The transceiver 510 may be adapted to transmit/receive applicable signals to/from users associated with the access point (compare with 141, 143, 145 of FIG. 1).

The controller 620 of the arrangement 600 may comprise one or more of a packet former (FORM) 621, a sensing unit (SENSE) 622, a timer (TIMER) 623, and a latency requirement unit (REQ) 624. The latency requirement unit may be adapted to provide a latency requirement for transmission to the access point (compare with step 121 of FIG. 1). The sensing unit may be adapted to sense the channel and the timer may be adapted to manage the waiting during the back-off period according to CSMA/CA procedure. The packet former may be adapted to format (e.g. fragment or spread over several sub-bands) packets to be transmitted so that the maximum duration of time is always employed (compare with step 136 of FIG. 1). The transceiver 610 may be adapted to transmit/receive applicable signals to/from the access point (compare with 141, 143, 145 of FIG. 1).

Thus, according to some embodiments, regular (non-high priority) and high priority users are allowed to time-share the transmission resources while ensuring a maximum limit (relating to the maximum duration of time and possibly to the sensing and/or back-off periods) on the initial deferral period for the high priority users.

As illustrated by the examples herein, this can be achieved in an OFDMA-based system. For example, mutually orthogonal sub-bands may be allocated to high priority users, so they do not compete with each other, regular users may be allowed to transmit in the remaining (non-allocated) sub-bands in the normal way and in the allocated sub-bands under special restrictions that ensure the maximum limit on the deferral period. Two examples of the special restrictions have been given in connection to FIGS. 3 and 4 and will be exemplified further in the following.

Comparing with the example of FIG. 3, the following provides an elaboration on how multiple high priority users may be assigned to orthogonal sub-bands in an OFDMA-system with guaranteed low latency. In this embodiment, it is assumed that the access point (AP) maintains a special mode, 'Fragmented-Packets and no-TXOP', on the sub-bands that have a high priority user associated with them. The start and end of this mode can, for example, be broadcast by the access point as specialized beacons (compare with 145 of FIG. 1).

The maximum number of high priority users allowed to associate with the AP may be a fraction (e.g. half) of the number of allowed sub-bands in the OFDMA-system. The maximum number of high priority users may also depend on the throughput requirements of the high priority users.

From among the number of sub-bands allowed for high priority users, the AP allocates one or more sub-band to each high priority user and thereby allows them to transmit simultaneously. This ensures that the associated high priority users do not compete with each other for channel access which could otherwise lead to longer delays.

Regular users are allowed to transmit in the remaining bands in the normal mode. Additionally, the AP may allow regular users to transmit in the sub-bands allocated for high priority users while enforcing a special (restricted) mode on their transmissions.

During the special mode, the high priority users (by virtue of their shorter sensing period and/or back-off period) win the contention over regular users with high probability whenever the medium is free.

When the high priority user does not contend, a regular user may transmit its data in sub-bands allocated for high priority users. However, due to the 'Fragmented-Packets and no-TXOP' mode being active, the regular user must fragment its data so that there is a short gap (typically shorter than the sensing period of a regular user, which ensures that the regular user can transmit the remaining fragments as long as the high priority user has no data to transmit, and/or longer than the sensing period of the high priority user) between the fragments. These gaps ensure that as soon as the high priority user is ready to transmit again, it will only find the medium busy for a short period (equal to the duration of one allowed fragment), resulting in a worst-case latency that does not violate the first latency requirement.

The fragmentation of the data can be adjusted according to the low latency requirements of the high priority user in the sub-band. The fragmentation length may also be set to be a multiple of the MPDU (Media Access Control—MAC—Protocol Data Unit) length for users transmitting aggregated MPDUs (A-MPDUs). In such cases it should be possible to attempt to retransmit only the missing MPDUs once the regular user wins the contention again (provided that the block ACK mechanism is employed).

A regular user in sub-bands allocated to high priority users may not request a transmission opportunity (TXOP) while the special mode is active since a TXOP may be longer than the determined maximum duration of time. In this context a transmission opportunity (TXOP) refers to a mode which allows a wireless communication device (e.g. a STA) to transmit multiple frames consecutively within a burst after it wins the channel. During this entire transmission opportunity, which typically spans multiple frames, the wireless communication device is not disturbed by other wireless communication devices.

Comparing now with the example of FIG. 4, the following provides an elaboration on how multiple high priority users may be assigned to orthogonal sub-bands in an OFDMA-system with guaranteed low latency. In this embodiment, it is assumed that the access point (AP) maintains a different special mode, 'Short-Duration and no-TXOP', on the sub-bands that have a high priority user associated with them.

The start and end of this mode can, for example, be broadcast by the access point as specialized beacons (compare with 145 of FIG. 1).

The maximum number of high priority users allowed to associate with the AP may be a fraction (e.g. half) of the number of allowed sub-bands in the OFDMA-system. The maximum number of high priority users may also depend on the throughput requirements of the high priority users.

From among the number of sub-bands allowed for high priority users, the AP allocates one or more sub-band to each high priority user and thereby allows them to transmit simultaneously. This ensures that the associated high priority users do not compete with each other for channel access which could otherwise lead to longer delays.

Regular users are allowed to transmit in the remaining bands in the normal mode. Additionally, the AP may allow regular users to transmit in the sub-bands allocated for high priority users while enforcing a special (restricted) mode on their transmissions.

During the special mode, the high priority users (by virtue of their shorter sensing period and/or back-off period) win the contention over regular users with high probability whenever the medium is free.

When the high priority user does not contend, a regular user may transmit its data in sub-bands allocated for high priority users. However, due to the 'Short-Duration and no-TXOP' mode being active, the regular user must ensure that each transmission is not longer than the maximum duration of time, which may be implemented as follows:

The AP calculates (and broadcasts) an integer value, N, which is a function of the low latency requirements set by all the high priority users currently associated with the AP. This value is updated and broadcast every time a high priority user joins or leaves the AP.

Regular users are not assigned fixed sub-bands. They learn the value of N through the AP at the time of association and later update it from the broadcasts. In the 'Short-Duration and no-TXOP' mode, they must listen to at least N (and typically all) sub-bands and must transmit over N (or more) sub-bands which may be done only when at least N of the sub-bands are free.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or an access point) comprising circuitry/logic or performing methods according to any of the embodiments.

Figure 7:
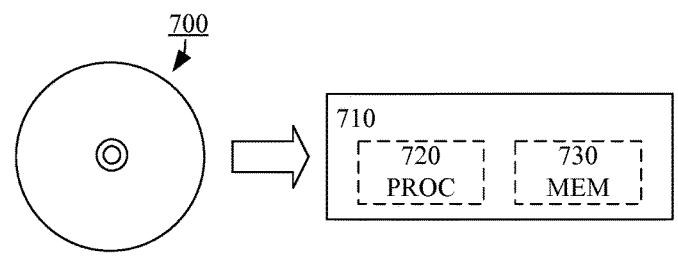
FIG. 7 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 700 illustrated in FIG. 7. The computer readable medium may have stored thereon a computer program comprising program instructions. The computer program may be loadable into a data-processing unit (PROC) 720, which may, for example, be comprised in a wireless communication device or an access point 710. When loaded into the data-processing unit, the computer program may be stored in a memory (MEM) 730 associated with or integral to the data-processing unit. According to some embodiments, the computer program may, when loaded into and run by the data-processing unit, cause the data-processing unit to execute method steps according to, for example, the methods shown in FIG. 1

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of an access point adapted to communicate, using a frequency bandwidth comprising one or more sub-bands, with wireless communication devices associated with the access point, wherein each of the wireless communication devices is adapted to operate under at least one of first and second latency requirements, the first latency requirement being lower than the second latency requirement, and wherein each of the wireless communication devices is adapted to use a listen-before-talk approach to access a sub-band for transmission, the method comprising:

for each of the sub-bands, allowing at most one wireless communication device operating under the first latency requirement to attempt accessing the sub-band;

for each sub-band where a wireless communication device operating under the first latency requirement is allowed to attempt accessing the sub-band, allowing also one or more wireless communication device operating under the second latency requirement to attempt accessing the sub-band; and enforcing a maximum duration of time for each transmission of a wireless communication device operating under the second latency requirement using a sub-band where a wireless communication device operating under the first latency requirement is allowed to attempt accessing the sub-band, wherein the maximum duration of time is based on the first latency requirement.

2. The method of claim 1 wherein using the listen-before-talk approach to access a sub-band for transmission comprises sensing the sub-band during a sensing period, initiating transmission if the sub-band was not used during the sensing period and, if the transmission collides with a transmission of another wireless communication device, waiting during a back-off period before repeating the sensing of the sub-band, and wherein at least one of the sensing period and the back-off period of a wireless communication device operating under the first latency requirement is shorter than a corresponding period of a wireless communication device operating under the second latency requirement.

3. The method of claim 2 wherein enforcing the maximum duration of time comprises instructing the wireless communication device operating under the second latency requirement to:

fragment data to be transmitted into packet parts, wherein each packet part is transmittable during the maximum duration using the sub-band; and transmit the packet parts with a transmission gap after each of the packet parts, wherein the transmission gap has a duration which is at least as long as the sensing period of a wireless communication device operating under the first latency requirement.

4. The method of claim 3 wherein the duration of the transmission gap is shorter than the sensing period of a wireless communication device operating under the second latency requirement.

5. The method of claim 2 wherein enforcing the maximum duration of time comprises determining an amount of sub-bands, wherein a packet of data to be transmitted is transmittable during the maximum duration of time using the amount of sub-bands, and instructing the wireless communication device operating under the second latency requirement to:

simultaneously sense multiple sub-bands, wherein the multiple is not less than the amount; and transmit the packet using the amount of sub-bands and only if at least the amount of sub-bands were not used during the sensing period.

6. The method of claim 5, further comprising transmitting an indication of the amount to the wireless communication device operating under the second latency requirement.

7. The method of claim 1, further comprising limiting a number of wireless communication devices associated with the access point and operating under the first latency requirement to a value, wherein the value is less than or equal to the one or more sub-bands comprised in the frequency bandwidth.

8. The method of claim 7 wherein the value is dependent on the first latency requirements of the wireless communication devices associated with the access point and operating under the first latency requirement.

9. The method of claim 1, further comprising, for each sub-band where no wireless communication device operating under the first latency requirement is allowed to attempt accessing the sub-band, allowing wireless communication devices operating under the second latency requirement to attempt accessing the sub-band.

10. The method according to claim 1, wherein the access point and the wireless communication devices are compliant with the Institute of Electrical and Electronics Engineers—IEEE—standard 802.11.

11. A method of a wireless communication device adapted to operate under a second latency requirement and associated with an access point, wherein the access point is adapted to communicate, using a frequency bandwidth comprising one or more sub-bands, with wireless communication devices associated with the access point, each of the wireless communication devices being adapted to operate under at least one of a first and the second latency requirements, the first latency requirement being lower than the second latency requirement, and wherein each of the wireless communication devices is adapted to use a listen-before-talk approach to access a sub-band for transmission, the method comprising:

employing a maximum duration of time for each transmission using a sub-band where a wireless communication device operating under the first latency requirement is allowed to attempt accessing the sub-band, wherein the maximum duration of time is based on the first latency requirement.

12. The method of claim 11 wherein using the listen-before-talk approach to access a sub-band for transmission comprises sensing the sub-band during a sensing period, initiating transmission if the sub-band was not used during the sensing period and, if the transmission collides with a transmission of another wireless communication device, waiting during a back-off period before repeating the sensing of the sub-band, and wherein at least one of the sensing period and the back-off period of a wireless communication device operating under the first latency requirement is shorter than a corresponding period of a wireless communication device operating under the second latency requirement.

13. The method of claim 12 wherein employing the maximum duration of time comprises:

fragmenting data to be transmitted into packet parts, wherein each packet part is transmittable during the maximum duration using the sub-band; and transmitting the packet parts with a transmission gap after each of the packet parts, wherein the transmission gap has a duration which is at least as long as the sensing period of a wireless communication device operating under the first latency requirement.

14. The method of claim 13 wherein the duration of the transmission gap is shorter than the sensing period of a wireless communication device operating under the second latency requirement.

15. The method of claim 12 wherein employing the maximum duration of time comprises:

simultaneously sensing multiple sub-bands, wherein the multiple is not less than an amount, wherein a packet of data to be transmitted is transmittable during the maximum duration of time using the amount of sub-bands; and transmitting the packet using the amount of sub-bands and only if at least the amount of sub-bands were not used during the sensing period.

16. The method of claim 15 further comprising receiving an indication of the amount from the access point.

17. A non-transitory computer readable medium, having thereon a computer program comprising program instructions, the computer program being loadable into a data-processing unit and adapted to cause execution of a method when the computer program is run by the data-processing unit, wherein the method is of an access point adapted to communicate, using a frequency bandwidth comprising one or more sub-bands, with wireless communication devices associated with the access point, wherein each of the wireless communication devices is adapted to operate under at least one of first and second latency requirements, the first latency requirement being lower than the second latency requirement, and wherein each of the wireless communication devices is adapted to use a listen-before-talk approach to access a sub-band for transmission, the method comprising:

for each of the sub-bands, allowing at most one wireless communication device operating under the first latency requirement to attempt accessing the sub-band;

for each sub-band where a wireless communication device operating under the first latency requirement is allowed to attempt accessing the sub-band, allowing also one or more wireless communication device operating under the second latency requirement to attempt accessing the sub-band; and enforcing a maximum duration of time for each transmission of a wireless communication device operating under the second latency requirement using a sub-band where a wireless communication device operating under the first latency requirement is allowed to attempt accessing the sub-band, wherein the maximum duration of time is based on the first latency requirement.

18. An arrangement for an access point adapted to communicate, using a frequency bandwidth comprising one or more sub-bands, with wireless communication devices associated with the access point, wherein each of the wireless communication devices is adapted to operate under at least one of first and second latency requirements, the first latency requirement being lower than the second latency requirement, and wherein each of the wireless communication devices is adapted to use a listen-before-talk approach to access a sub-band for transmission, the arrangement comprising a controller adapted to cause:

for each of the sub-bands, allowance of at most one wireless communication device operating under the first latency requirement to attempt accessing the sub-band;

for each sub-band where a wireless communication device operating under the first latency requirement is allowed to attempt accessing the sub-band, allowance of also one or more wireless communication device operating under the second latency requirement to attempt accessing the sub-band; and enforcement of a maximum duration of time for each transmission of a wireless communication device operating under the second latency requirement using a sub-band where a wireless communication device operating under the first latency requirement is allowed to attempt accessing the sub-band, wherein the maximum duration of time is based on the first latency requirement.

19. The arrangement of claim 18 wherein using the listen-before-talk approach to access a sub-band for transmission comprises sensing the sub-band during a sensing period, initiating transmission if the sub-band was not used during the sensing period and, if the transmission collides with a transmission of another wireless communication device, waiting during a back-off period before repeating the sensing of the sub-band, and wherein at least one of the sensing period and the back-off period of a wireless communication device operating under the first latency requirement is shorter than a corresponding period of a wireless communication device operating under the second latency requirement.

20. The arrangement of claim 19 wherein the controller is adapted to cause enforcement of the maximum duration of time by instructing the wireless communication device operating under the second latency requirement to:

fragment data to be transmitted into packet parts, wherein each packet part is transmittable during the maximum duration using the sub-band; and transmit the packet parts with a transmission gap after each of the packet parts, wherein the transmission gap has a duration which is at least as long as the sensing period of a wireless communication device operating under the first latency requirement.

21. The arrangement of claim 20 wherein the duration of the transmission gap is shorter than the sensing period of a wireless communication device operating under the second latency requirement.

22. The arrangement of claim 19 wherein the controller is adapted to cause enforcement of the maximum duration of time by determining an amount of sub-bands, wherein a packet of data to be transmitted is transmittable during the maximum duration of time using the amount of sub-bands, and instructing the wireless communication device operating under the second latency requirement to:

simultaneously sense multiple sub-bands, wherein the multiple is not less than the amount; and transmit the packet using the amount of sub-bands and only if at least the amount of sub-bands were not used during the sensing period.

23. The arrangement of claim 22, wherein the controller is further adapted to cause transmission of the amount to the wireless communication device operating under the second latency requirement.

24. The arrangement of claim 18, wherein the controller is further adapted to cause limitation of a number of wireless communication devices associated with the access point and operating under the first latency requirement to a value, wherein the value is less than or equal to the one or more sub-bands comprised in the frequency bandwidth.

25. The arrangement of claim 24 wherein the value is dependent on the first latency requirements of the wireless communication devices associated with the access point and operating under the first latency requirement.

26. The arrangement of claim 18, wherein the controller is further adapted to cause, for each sub-band where no wireless communication device operating under the first latency requirement is allowed to attempt accessing the sub-band, allowance of wireless communication devices operating under the second latency requirement to attempt accessing the sub-band.

27. An access point comprising the arrangement of claim 18.

28. The access point of claim 27 wherein the access point is compliant with the Institute of Electrical and Electronics Engineers—IEEE—standard 802.11.

29. An arrangement for a wireless communication device adapted to operate under a second latency requirement and associated with an access point, wherein the access point is adapted to communicate, using a frequency bandwidth comprising one or more sub-bands, with wireless communication devices associated with the access point, each of the wireless communication devices being adapted to operate under at least one of a first and the second latency requirements, the first latency requirement being lower than the second latency requirement, and wherein each of the wireless communication devices is adapted to use a listen-before-talk approach to access a sub-band for transmission, the arrangement comprising a controller adapted to cause:

employment of a maximum duration of time for each transmission using a sub-band where a wireless communication device operating under the first latency requirement is allowed to attempt accessing the sub-band, wherein the maximum duration of time is based on the first latency requirement.

30. The arrangement of claim 29 wherein using the listen-before-talk approach to access a sub-band for transmission comprises sensing the sub-band during a sensing period, initiating transmission if the sub-band was not used during the sensing period and, if the transmission collides with a transmission of another wireless communication device, waiting during a back-off period before repeating the sensing of the sub-band, and wherein at least one of the sensing period and the back-off period of a wireless communication device operating under the first latency requirement is shorter than a corresponding period of a wireless communication device operating under the second latency requirement.

31. The arrangement of claim 30 wherein the controller is adapted to cause employment of the maximum duration of time by causing:

fragmentation of data to be transmitted into packet parts, wherein each packet part is transmittable during the maximum duration using the sub-band; and transmission of the packet parts with a transmission gap after each of the packet parts, wherein the transmission gap has a duration which is at least as long as the sensing period of a wireless communication device operating under the first latency requirement.

32. The arrangement of claim 31 wherein the duration of the transmission gap is shorter than the sensing period of a wireless communication device operating under the second latency requirement.

33. The arrangement of claim 30 wherein the controller is adapted to cause employment of the maximum duration of time by causing:

simultaneous sensing of multiple sub-bands, wherein the multiple is not less than an amount, wherein a packet of data to be transmitted is transmittable during the maximum duration of time using the amount of sub-bands; and transmission of the packet using the amount of sub-bands and only if at least the amount of sub-bands were not used during the sensing period.

34. The arrangement of claim 33 wherein the controller is further adapted to cause reception of an indication of the amount from the access point.

35. A wireless communication device comprising the arrangement of claim 29.

36. The wireless communication device of claim 35 wherein the wireless communication device is compliant with the Institute of Electrical and Electronics Engineers —IEEE—standard 802.11 version.

* * * * *